United States Patent
Noda

(10) Patent No.: US 7,432,849 B2
(45) Date of Patent: Oct. 7, 2008

(54) FREQUENCY MODULATION RADAR APPARATUS FOR VEHICLE USE BACKGROUND OF THE INVENTION

(75) Inventor: Shinsaku Noda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 11/655,935

(22) Filed: Jan. 22, 2007

(65) Prior Publication Data
US 2008/0122679 A1 May 29, 2008

(30) Foreign Application Priority Data
Sep. 20, 2006 (JP) ............... 2006-254176

(51) Int. Cl.
*G01S 13/00* (2006.01)
(52) U.S. Cl. .............. 342/70; 342/109; 342/128; 342/192; 342/196
(58) Field of Classification Search ........ 342/70, 342/71, 104, 109, 115, 128, 134, 175, 192, 342/196; 701/47, 70, 96, 116
See application file for complete search history.

(56) References Cited

U.S. PATENT DOCUMENTS

| | | | | |
|---|---|---|---|---|
| 5,731,778 A | * | 3/1998 | Nakatani et al. | 342/70 |
| 5,751,240 A | * | 5/1998 | Fujita et al. | 342/70 |
| 5,757,307 A | * | 5/1998 | Nakatani et al. | 342/70 |
| 6,317,073 B1 | * | 11/2001 | Tamatsu et al. | 342/70 |
| 6,320,531 B1 | * | 11/2001 | Tamatsu | 342/109 |
| 6,657,582 B2 | * | 12/2003 | Seki et al. | 342/70 |
| 6,686,870 B2 | * | 2/2004 | Nishimura et al. | 342/70 |
| 6,795,012 B2 | * | 9/2004 | Nakanishi et al. | 342/70 |
| 7,023,376 B1 | * | 4/2006 | Kuroda et al. | 342/70 |
| 7,336,218 B2 | * | 2/2008 | Nishimura et al. | 342/70 |
| 7,339,517 B2 | * | 3/2008 | Nakanishi | 342/70 |
| 2002/0180633 A1 | * | 12/2002 | Nakanishi et al. | 342/70 |
| 2003/0112173 A1 | * | 6/2003 | Seki et al. | 342/70 |
| 2003/0151544 A1 | * | 8/2003 | Nishimura et al. | 342/70 |
| 2004/0246167 A1 | * | 12/2004 | Kumon et al. | 342/70 |
| 2005/0017891 A1 | * | 1/2005 | Kuroda et al. | 342/70 |
| 2007/0103360 A1 | * | 5/2007 | Nakanishi | 342/70 |
| 2008/0088500 A1 | * | 4/2008 | Ishii et al. | 342/109 |

FOREIGN PATENT DOCUMENTS

JP 2003-240842 A 8/2003

* cited by examiner

*Primary Examiner*—Thomas H. Tarcza
*Assistant Examiner*—Peter M Bythrow
(74) *Attorney, Agent, or Firm*—Sughrue Mion, PLLC

(57) ABSTRACT

A frequency modulation radar apparatus for vehicle use can suppress the influence of noise to avoid incorrect estimation due to noise thereby to provide a beat frequency with high accuracy and at high speed without increasing the frequency resolution of the beat frequency that causes an increase in an observation time. The apparatus includes a frequency correction section that calculates a corrected frequency ($f_n+\delta$) by adding an amount of frequency correction ($\delta$) to the frequency ($f_n$) of a peak signal, and a CPU that calculates a distance or a relative speed to a target object based on the corrected frequency ($f_n+\delta$). In an FFT calculation section, the frequency ($f_t$) of the true peak signal is calculated based on the characteristic of a window function, and if the frequency ($f_t$) thus calculated is determined as an incorrect estimation, the frequency of the true peak signal is further corrected.

14 Claims, 7 Drawing Sheets

FREQUENCY MODULATION RADAR APPARATUS FOR VEHICLE USE

BACKGROUND OF THE INVENTION

BACKGROUND OF THE INVENTION

1. Field of the Invention

The present invention relates to a frequency modulation radar apparatus for vehicle use which is installed on a motor vehicle for measuring the distance, the relative speed, etc., to a neighboring vehicle for the purpose of being used for vehicle-to-vehicle distance control, collision damage reduction, etc.

2. Description of the Related Art

Conventionally, there has been well known a frequency modulation radar apparatus for vehicle use which sends a transmission signal the frequency of which is frequency modulated so as to linearly rise or fall in accordance with the elapse of time, receives the signal reflected by a target object, samples a beat signal that is obtained by mixing the reception signal thus received with the transmission signal, performs a discrete frequency analysis by using a predetermined window function, extracts a peak signal from the spectrum of a beat signal thus obtained, and calculates a distance or a relative speed to the target object based on the frequency of the peak signal.

As such a kind of frequency modulation radar apparatus for vehicle use, there has generally been known one that is constructed as shown in a block diagram of FIG. 8 for example. In FIG. 8, the frequency modulation radar apparatus for vehicle use is composed of a CPU 1, a modulation voltage generation part 2, a voltage controlled oscillator (VCO) 3, a circulator 4, an antenna 5, a mixer 6, an A/D converter 7 and an FFT (fast Fourier transform) calculation section 8.

When an instruction for starting modulation is given from the CPU 1, the modulation voltage generation part 2 impresses a triangular wave voltage to the VCO 3. The VCO 3 frequency modulates a carrier wave according to the triangular wave voltage, and transmits it to the antenna 5 as an transmission signal through the circulator 4, and at the same time inputs the transmission signal to the mixer 6. The antenna 5 radiates the transmission signal as a radio wave toward a target object X, receives the radio wave reflected by the target object X and transmits it to the circulator 4 as a reception signal. The circulator 4 inputs the reception signal to the mixer 6 which mixes the reception signal and the transmission signal with each other thereby to output a beat signal. The A/D converter 7 samples the beat signal and inputs the result of the sampling to the FFT calculation section 8. The FFT calculation section 8, after multiplying the beat signal thus sampled by a predetermined window function, performs fast Fourier transform (FFT) on the sampled beat signal thus multiplied.

FIG. 9 is an explanatory view that shows one example of the spectrum of the beat signal, wherein the axis of abscissa represents the frequency [x 1/T] of the beat signal, and the axis of ordinate represents the strength of the beat signal, with the frequency of a true peak signal being designated by "$f_t$".

In FIG. 9, T in the unit [1/T] on the axis of abscissa is an observation time, individual points indicated by round marks represent a discrete spectrum of the beat signal, and solid lines represent envelopes of the discrete spectrum (i.e., continuous spectrum shapes corresponding to the window function).

When the spectrum of the beat signal is in a state shown in FIG. 9, the FFT calculation section 8 transmits a frequency $f_n$ and a strength $a_n$ (peak value) of the peak signal in the discrete spectrum to the CPU 1 as the frequency and strength of the beat signal. Accordingly, the CPU 1 calculates the distance, the relative speed, etc., of the target object X based on the frequency $f_n$ and the strength $a_n$ of the peak signal, and outputs them to an external device (not shown) as target object information Y.

At this time, the frequency interval of the discrete spectrum according to the fast Fourier transform is represented by a frequency resolution 1/T (the reciprocal of the observation time T), so the frequency $f_n$ of the peak signal in the discrete spectrum generally has an amount of deviation (corresponding to an amount of frequency correction to be described later) $\delta$ [1/T] with respect to a frequency $f_t$ of the true peak signal. Here, if the frequency resolution 1/T is to be set to a small value so as to detect the target object X with a high degree of precision, the observation time T will naturally increase and the processing time will also increase, and hence this is not desirable.

Accordingly, in the past, there has been proposed a radar apparatus that serves to cope with the above-mentioned problem (see, for example, a first patent document: Japanese patent application laid-open No. 2003-240842). In this first patent document, the frequency spectrum of a window function is fitted to the discrete spectrum of a beat signal whereby a target object X is detected by making a peak of the window function thus fitted as a true peak. Alternatively, an amount of deviation $\delta$ between the frequency $f_n$ of a peak signal of the discrete spectrum and the frequency $f_t$ of a true peak signal is beforehand represented as a function of the strength of the discrete spectrum based on a window function, and the amount of deviation $\delta$ is calculated from the strength of the discrete spectrum obtained by fast Fourier transform.

In the radar apparatus described in the above-mentioned first patent document, specifically, in case of using a Hanning window, it is assumed that a strength ratio $\Delta P$ between strengths $a_t$ the opposite adjacent sides of the frequency $f_t$ of the peak signal in the discrete spectrum is represented by the following expression using the strengths ($a_{n-1}$, $a_{n+1}$) of the discrete spectrum $a_t$ the opposite adjacent sides of the frequency $f_t$ of the true peak signal in FIG. 9.

$$\Delta P = a_{n+1}/a_{n-1}$$

At this time, the logarithm $\Delta P_{dB}$ of the strength ratio $\Delta P$ is represented by the following expression (9).

$$\Delta P_{dB} = 20 \log(\Delta P) = 20 \log \frac{(1+\delta)(2+\delta)}{(1-\delta)(2-\delta)} \quad (9)$$

Accordingly, the amount of deviation $\delta$ is calculated by the following expression (10) which linearly approximates the relation of the above expression (9).

$$\delta = 3.67 \times 10^{-2} \Delta P_{dB} \quad (10)$$

In the conventional frequency modulation radar apparatus for vehicle use, in actuality, there exists noise resulting mainly from thermal noise, so the signal strengths $a_{n-1}$, $a_n$, $a_{n+1}$ of the discrete spectrum obtained by fast Fourier transform become different from the values theoretically predicted, and hence there arises a problem that an error occurs in the estimated value of the amount of deviation $\delta$ that is calculated in the manner as shown in the above-mentioned first patent document. In addition, there is also another problem that a correction method, though required for reducing the influence of noise so as to ensure sufficient accuracy, can not be achieved. Moreover, there is a further problem that a linear approximation, being used in the correction of the frequency $f_n$ of the peak signal, becomes a cause for the occurrence of an undesirable error.

SUMMARY OF THE INVENTION

In view of the above, the present invention is intended to obviate the problems as referred to above, and has for its object to obtain a frequency modulation radar apparatus for vehicle use which is capable of suppressing the influence of noise to avoid incorrect estimation due to noise thereby to provide a beat frequency with high accuracy and at high speed without increasing the frequency resolution of a beat frequency that causes an increase in an observation time.

Bearing the above object in mind, according to the present invention, there is provided a frequency modulation radar apparatus for vehicle use which sends a transmission signal the frequency of which is frequency modulated so as to linearly rise or fall in accordance with the elapse of time, receives the signal reflected by a target object, samples a beat signal that is obtained by mixing the reception signal thus received with the transmission signal, performs a discrete frequency analysis by using a predetermined window function, extracts a peak signal from a spectrum of the beat signal obtained, and calculates a distance or a relative speed to the target object based on a frequency ($f_n$) of the peak signal. The frequency modulation radar apparatus includes: a frequency correction section that adds an amount of frequency correction ($\delta$) to the frequency ($f_n$) of the peak signal thereby to calculate a corrected frequency ($f_n+\delta$); and a CPU that calculates the distance or relative speed to the target object based on the corrected frequency ($f_n+\delta$). By using a strength ($a_n$) of the peak signal, a strength ($a_{n-1}$) of a signal of which a discrete frequency is smaller by one than that of the peak signal, a strength ($a_{n+1}$) of a signal of which a discrete frequency is larger by one than that of the peak signal, and a strength ($a_{max}$) of one of the strength ($a_{n-1}$) and the strength ($a_{n+1}$) which is not smaller than the other, the frequency correction section calculates the amount of frequency correction ($\delta$) based on the strength ($a_n$) of the peak signal, the strength ($a_{max}$) and a characteristic of the window function. When the strength ($a_{n-1}$) is larger than the strength ($a_{n+1}$) and the amount of frequency correction ($\delta$) is positive, or when the strength ($a_{n-1}$) is less than or equal to the strength ($a_{n+1}$) and the amount of frequency correction ($\delta$) is negative, the frequency correction section correctively sets the amount of frequency correction ($\delta$) to zero ($\delta=0$).

According to the present invention, a true peak value can be made to coincide with a peak value of a discrete spectrum, whereby a beat frequency can be obtained with a high degree of accuracy and at high speed.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described while referring to the accompanying drawings.

Embodiment 1

Figure 1:
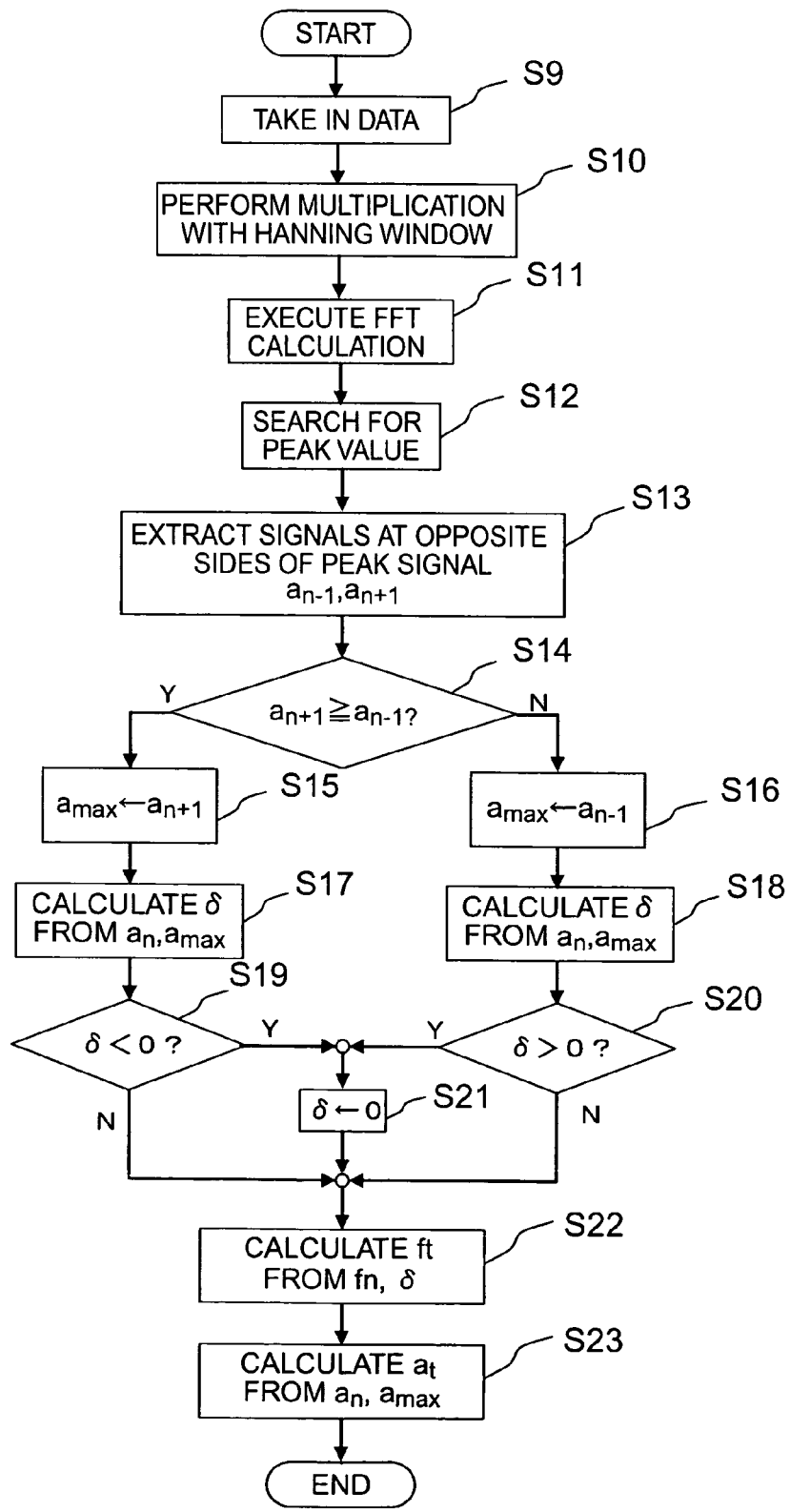
FIG. 1 is a flow chart illustrating the operation of an FFT calculation section according to a first embodiment of the present invention.

Referring to the drawings and first to FIG. 1, there is shown a flow chart that illustrates FFT calculation processing by a frequency modulation radar apparatus for vehicle use according to a first embodiment of the present invention. Here, note that the construction of the frequency modulation radar apparatus for vehicle use according to the first embodiment of the present invention is similar to that of the above-mentioned conventional apparatus (see FIG. 8), but is only different therefrom in a part of the calculation processing of the frequency $f_n$ and the strength $a_n$ of a peak signal in an FFT calculation section 8.

In addition, the operation of the frequency modulation radar apparatus of this invention until a sampled beat signal is input to the FFT calculation section 8 and the processing operation of a CPU 1 are similar to those as stated before, and hence a detailed explanation thereof is omitted here.

In this case, the FFT calculation section 8 (see FIG. 8) is provided with a frequency correction section that calculates a corrected frequency $f_n+\delta$ by adding an amount of frequency correction $\delta$ to the frequency $f_n$ of the peak signal, and the CPU 1 calculates a distance or a relative speed to a target object based on the corrected frequency $f_n+\delta$.

Further, as will be described later, the frequency correction section in the FFT calculation section 8 calculates the amount of frequency correction $\delta$ based on the strength $a_n$ of the peak signal, an under-mentioned strength $a_{max}$ and the characteristic of the window function, by using the strength $a_n$ of the peak signal, a strength $a_{n-1}$ of a signal of which the discrete frequency is smaller by one than that of the peak signal, a strength $a_{n+1}$ of a signal of which the discrete frequency is larger by one than that of the peak signal, and the strength $a_{max}$ which is one of the strengths $a_{n-1}$, $a_{n+1}$, not smaller than the other.

In addition, when the strength $a_{n-1}$ is larger than the strength $a_{n+1}$ and the amount of frequency correction $\delta$ is positive, or when the strength $a_{n-1}$ is less than or equal to the strength $a_{n+1}$ and the amount of frequency correction $\delta$ is negative, the frequency correction section correctively sets the amount of frequency correction $\delta$ to zero ($\delta=0$).

In FIG. 1, first of all, the FFT calculation section 8 takes in the sampled beat signal (step S9), and then the sampled beat signal is multiplied by a Hanning window function $W_{han}(t)$, as shown in the following expression (11) (step S10).

$$W_{han}(t) = \begin{cases} \frac{1}{2} - \frac{1}{2}\cos\frac{2\pi}{T}t & (0 \leq t \leq T) \\ 0 & (t < 0, t > T) \end{cases} \quad (11)$$

Figure 9:
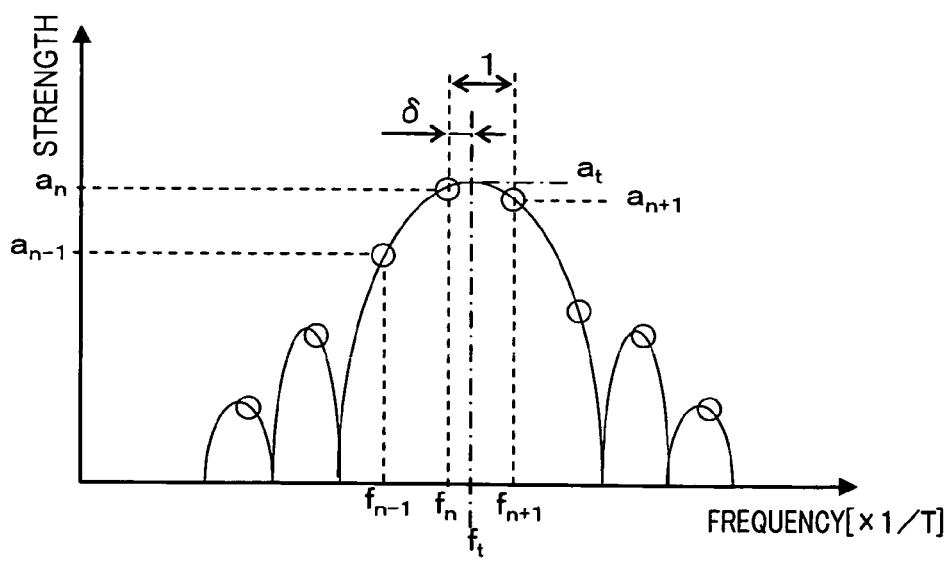
FIG. 9 is an explanatory view showing one example of the spectrum shape of a beat signal.

Subsequently, an FFT (fast Fourier transform) calculation is executed (step S11) to obtain a discrete spectrum as shown in FIG. 9. Here, note that, needless to say, the discrete spectrum obtained by the FFT calculation spreads in such a shape that a reception signal reflected from the target object X forms an envelop of a continuous spectrum of a Hanning window.

Also, the FFT calculation section 8 searches for a peak signal from the discrete spectrum obtained by the FFT calculation, and obtains the frequency $f_n$ and the strength $a_n$ of the peak signal as peak values (step S12).

The above-mentioned steps S9 through S12 are similar to the processing according to the conventional FFT calculation section 8, but in the present invention, in order to estimate the frequency $f_t$ and the signal strength of the true peak signal in consideration of the variation in the individual signal strengths of the discrete spectrum due to noise, two pieces of discrete spectrum information as minimum required are used as follows.

As the variation of the signal strength of the discrete spectrum due to noise decreases in accordance with the increasing signal strength, the true peak signal is estimated by using a peak signal in the discrete spectrum and signal information of one of two signals adjoining the peak signal which is not smaller in strength than the other.

That is, the one smaller in strength than the other, among the adjoining signals which are large in the variation of the signal strength due to noise and hence can be causes for increasing an error upon estimation of the true peak signal, is not used.

Accordingly, signals at the opposite adjacent sides of the peak signal (hereinafter referred to as the opposite side signals) are first extracted on the basis of the above-mentioned viewpoint, and the individual strengths $a_{n-1}, a_{n+1}$ of the opposite side signals are acquired (step S13).

That is, the strength $a_{n+1}$ of the signal larger by one in the discrete frequency than the peak signal and the strength $a_{n-1}$ of the signal smaller by one in the discrete frequency than the peak signal are obtained.

Here, reference will be made to the specific shape of the spectrum according to the Hanning window function.

The Fourier transform is applied to the Hanning window function $W_{han}(t)$ shown in the above expression (11), and the result thus obtained is multiplied by the frequency resolution 1/T(=1 bin) in the FFT calculation so as to be normalized to provide a maximum value of "1", whereby the following expression (12) is obtained as a signal strength $A_{han}(\delta)$ in the frequency drift (deviation) amount (the amount of frequency correction) $\delta[1/T]$.

$$A_{han}(\delta) = \left|\frac{\sin\pi\delta}{\pi\delta(1-\delta^2)}\right|, A_{han}(0) = 1, A_{han}(\pm 1) = \frac{1}{2} \quad (12)$$

Next, reference will be made to a method of acquiring the frequency $f_t$ of the true peak signal based on the above expression (12) while referring to FIG. 9.

Now, it is assumed that the frequency $f_t$ of the true peak signal is given by the frequency $f_n$ of the peak signal plus the amount of frequency correction $\delta$ (i.e., $f_t = f_n + \delta$). In addition, it is assumed that the strength $a_t$ of the true peak signal is 1 ($a_t=1$) without losing generality.

First of all, let us consider the case where the amount of frequency correction $\delta$ is positive ($\delta \geq 0$). In this connection, note that the peak signal will move to the next when the amount of frequency correction $\delta$ exceeds 0.5 ($\delta > 0.5$), as is clear from FIG. 9. Here, the amount of frequency correction $\delta$ need only be considered to be within a range of $0 \leq \delta \leq 0.5$.

At this time, the strengths of the individual signals are in a relation of $a_{n-1} \leq a_{n+1}$, so the frequency $f_t$ of the true peak signal is calculated by using the respective strengths $a_n, a_{n+1}$.

Also, the respective strengths $a_n, a_{n+1}$ are calculated, as shown by the following expression (13).

$$\begin{cases} a_n = A_{han}(-\delta) = \frac{\sin\pi\delta}{\pi\delta(1-\delta)(1+\delta)} \\ a_{n+1} = A_{han}(1-\delta) = \frac{\sin\pi\delta}{\pi\delta(1-\delta)(2-\delta)} \end{cases} \quad (13)$$

In addition, the following expression (14) holds from the above expression (13).

$$\frac{a_n - a_{n+1}}{a_n + a_{n+1}} = \frac{1-2\delta}{3} \quad (14)$$

$$\therefore \delta = \frac{2a_{n+1} - a_n}{a_{n+1} + a_n}$$

Here, if the relation of strengths $2a_{n+1}, a_n$ of the spectrum actually observed becomes "$2a_{n+1} < a_n$" due to the influence of noise, etc., the amount of frequency correction $\delta$ calculated by the above expression (14) is a negative value ($\delta < 0$) in spite of the fact that it is not actually negative ($\delta \geq 0$).

Accordingly, when the amount of frequency correction $\delta$ is calculated as negative ($\delta < 0$) according to the expression (14), the accuracy of the frequency correction can be improved by correctively setting the amount of frequency correction $\delta$ to zero ($\delta = 0$).

Next, reference will be made to a method of estimating the strength $a_t$ of the true peak signal.

First of all, as stated above, the signal strength Ahan($\delta$) in the amount of frequency correction $\delta$ is normalized so as to make the maximum value equal to "1", so the following expression (15) holds.

$$a_n = a_t \frac{\sin\pi\delta}{\pi\delta(1-\delta)(1+\delta)} \quad (15)$$

Subsequently, the following estimation expression (3) is obtained by assigning the above expression (14) to the following expression (15).

$$a_t = \frac{3\pi a_{max}(2a_{max} - a_n)(2a_n - a_{max})}{(a_{max} + a_n)^3 \sin\left(\frac{2a_{max} - a_n}{a_{max} + a_n}\pi\right)} \times a_n \quad (3)$$

On the other hand, when the amount of frequency correction $\delta$ is negative ($\delta < 0$), too, the following expression (16) can be derived by calculating the strength $a_{n-1}$ of the signal at a frequency $f_{n-1}$ as $A_{han}(-1-\delta)$ (i.e., $a_{n-1}=A_{han}(-1-\delta)$).

$$\delta = -\frac{2a_{n-1} - a_n}{a_{n-1} + a_n} \quad (16)$$

In addition, the amount of frequency correction δ, when calculated as δ>0 according to the above expression (16) due to the influence of noise, etc., is correctively set to zero (δ=0). Further, it is possible to easily derive that the strength at of the true peak signal can be calculated by the above expression (3).

Accordingly, based on the above point of view, in FIG. 1, there is shown a processing procedure (steps S14 through S23) until the frequency $f_t$ and the strength $a_t$ of the true peak signal are estimated by using the strengths $a_{n-1}$, $a_{n+1}$ at the opposite adjacent sides of the peak signal obtained in step S13.

First of all, a comparison is made between the strength $a_{n-1}$ at the frequency $f_{n-1}$ and the strength $a_{n+1}$ at the frequency $f_{n+1}$, so that it is determined whether $a_{n+1} \geq a_{n-1}$ (step S14).

When it is determined as $a_{n+1} \geq a_{n-1}$ in step S14 (that is, YES), $a_{n+1}$ is set as the strength $a_{max}$ of one of the opposite side signals which is not smaller in signal strength than the other (step S15), and the amount of frequency correction δ is calculated by the following expression (1) (step S17).

$$\delta = \begin{cases} \dfrac{2a_{n+1} - a_n}{a_{n+1} + a_n} & (\text{when } a_{n-1} \leq a_{n+1}) \\ -\dfrac{2a_{n-1} - a_n}{a_{n-1} + a_n} & (\text{when } a_{n-1} > a_{n+1}) \end{cases} \quad (1)$$

On the other hand, when it is determined as $a_{n+1} < a_{n-1}$ in step S14 (that is, NO), $a_{n-1}$ is set as the strength $a_{max}$ of one of the opposite side signals which is not smaller than the other (step S16), and the amount of frequency correction δ is calculated by the above expression (1) (step S18).

Then, subsequent to the calculation processing of the amount of frequency correction δ (step S17), it is determined whether the sign of the amount of frequency correction δ is negative (δ<0) (step S19), and when it is determined as δ<0 (that is, YES), it is assumed that a further correction of the amount of frequency correction δ is necessary, and the amount of frequency correction 6 is correctively set to zero (δ=0) (step S21).

Similarly, subsequent to the calculation processing of the amount of frequency correction δ (step S18), it is determined whether the sign of the amount of frequency correction δ is positive (δ>0) (step S20), and when it is determined as δ>0 (that is, YES), it is assumed that a further correction of the amount of frequency correction δ is necessary, and the amount of frequency correction δ is correctively set to zero (δ=0) (step S21).

On the other hand, when it is determined as δ≧0 in step S19 (that is, NO), and when it is determined as δ≦0 in step S20 (that is, NO), the control flow proceeds to step S22 without executing step S21.

Then, following the step S21, the frequency $f_t$ of the true peak signal is calculated as a corrected frequency $f_n+\delta$ (step S22).

Finally, the FFT calculation section 8 calculates the strength at of the true peak signal by using the above expression (3) (step S23), and inputs the frequency $f_t$ and the strength $a_t$ of the true peak signal obtained in steps S22, S23 to the CPU 1 as corrected FFT calculation results.

Hereinafter, the operation of the CPU 1 is similar to that in the aforementioned conventional apparatus, and hence a detailed explanation thereof is omitted here.

Although in the above-mentioned first embodiment, the strength at of the true peak signal is calculated by using the expression (3), an approximate expression comprising the following expression (4) may be used so as to simplify (i.e., speed up) the arithmetic calculation.

$$a_t = 0.81 a_n + 0.35 a_{max} \quad (4)$$

In the above expression (4), individual coefficients "0.81", "0.35" are the values that are set to minimize the absolute value of a strength error on the assumption that a linear combination of individual strengths $a_n$, $a_{n+1}$ is taken as the strength at of the true peak signal (in case of $a_{+1} \geq a_{n-1}$).

Here, reference will be made to the effectiveness of the expression (4) while referring to an explanatory view of FIG. 2.

Figure 2:
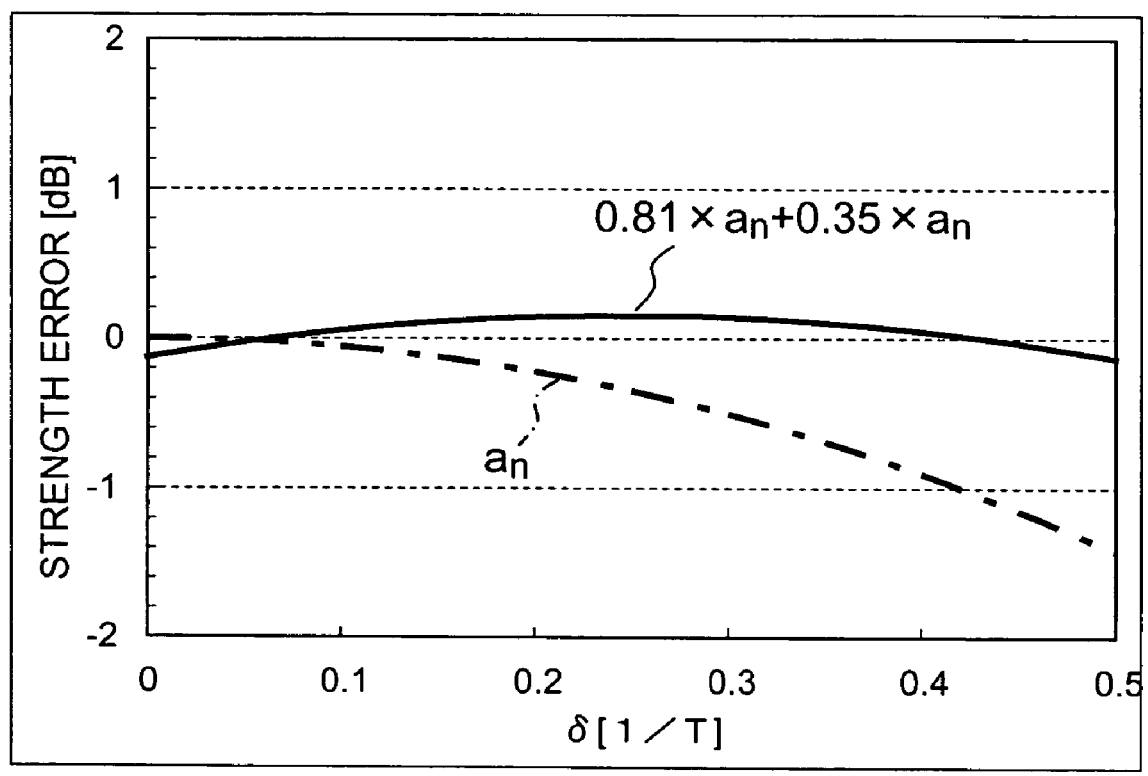
FIG. 2 is an explanatory view showing a strength error of a true peak signal when a Hanning window is used according o the first embodiment of the present invention.

When the strength $a_n$ is used as it is as the strength $a_t$ of the true peak signal, a strength error, indicated by an alternate long and short dash line in FIG. 2, will occur in accordance with the amount of frequency correction δ, so the strength $a_t$ of the true peak signal will have an error of about 1.4 [dB] at maximum, as is clear from the above-mentioned expression (13).

On the other hand, in case where the strength at obtained from the above-mentioned approximate expression (4) is taken as the strength of the true peak signal, the strength error is improved, as shown by a solid line in FIG. 2, and even in the worst case, an accuracy with a strength error of less than 0.2 [dB] can be obtained.

Although description has been made of the case of $a_{n+1} \geq a_{n-1}$ (see FIG. 9), it is needless to say that similarly excellent accuracy can be obtained even in case of $a_{n+1} < a_{n-1}$.

As described above, in the first embodiment of the present invention, in order to reduce, as much as possible, the influence of noise on the discrete spectrum used to find the frequency $f_t$ or the strength at of the true peak signal, there are used signals of frequencies of the two locally largest signal strengths around the peak signal in the discrete spectrum.

In addition, particularly in case of using the Hanning window as a window function, the correction is performed based on strict theoretical formulae without using approximations.

Further, in case where there is a contradiction between the correction result of the frequency $f_n$ of the peak signal and the magnitude correlation of the signal strengths of the discrete spectrum signal due to the influence of noise, a true peak value is corrected so as to be set to the same value as the peak value of the discrete spectrum, thereby preventing an incorrect correction.

Accordingly, according to the first embodiment of the present invention, the amount of frequency correction δ is calculated based on the characteristic of the window function by using the strength of the peak signal and the strength of one of the signals at the opposite adjacent sides of the peak signal which is not smaller in signal strength than the other, and the amount of frequency correction δ is further corrected in accordance with the sign of the amount of frequency correction δ. As a result, the beat frequency can be obtained with a high degree of accuracy while suppressing the influence of noise and avoiding an incorrect estimation due to noise.

In addition, the amount of frequency correction δ is calculated according to the above expression (1) based on theoretical computations, with respect to the FFT calculation result that uses the Hanning window, so it is suitable for the FFT calculation result using the Hanning window, and the beat frequency can be obtained more accurately.

Further, the strength $a_t$ of the true peak signal is calculated according to the above expression (3) based on theoretical computations, with respect to the FFT calculation result using the Hanning window, so it is suitable for the FFT calculation result using the Hanning window, and the strength of the true peak signal can be obtained with high accuracy.

Furthermore, the strength $a_t$ of the true peak signal is calculated according to the above expression (4) with respect to the FFT calculation result using the Hanning window, so it is suitable for the FFT calculation result using the Hanning window, and the strength of the true peak signal can be obtained at high speed.

Embodiment 2

Although in the above-mentioned first embodiment, an additive correction of the amount of frequency correction $\delta$ is used to calculate the frequency $f_t$ of the true peak signal, the frequency $f_t$ of the true peak signal may be calculated by using a strength $a_{max}$ of one of the strengths $a_{n-1}$, $a_{n+1}$ which is not smaller than the other and a frequency $f_{max}$ corresponding to the strength $a_{max}$ based on a linear combination of the frequency $f_n$ of the peak signal and the frequency $f_{max}$.

Figure 8:
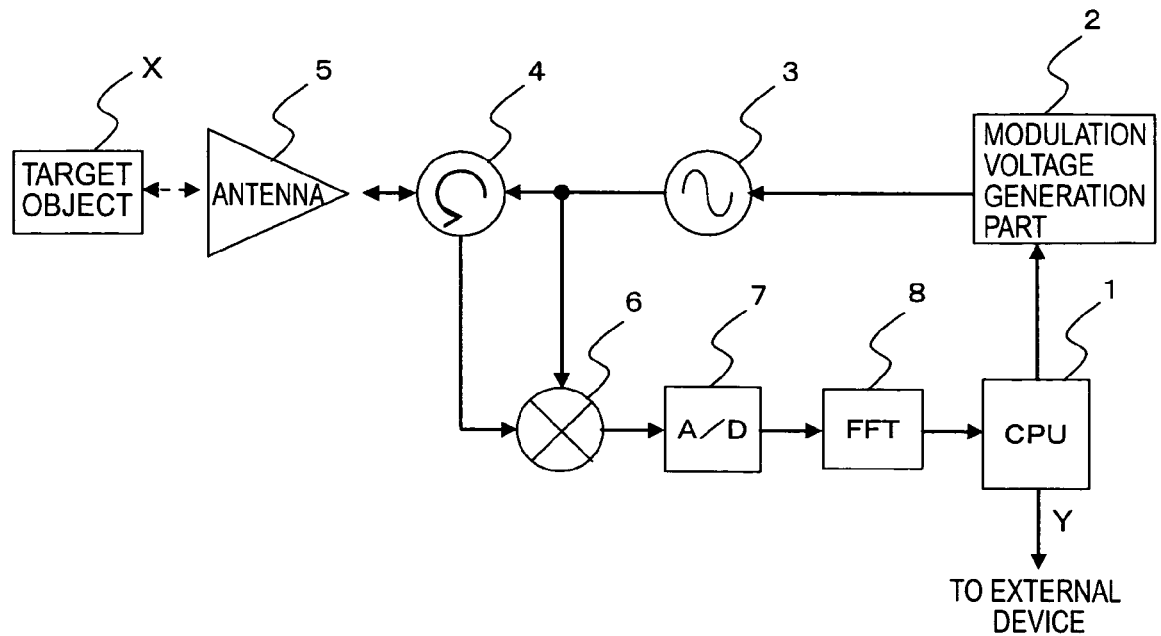
FIG. 8 is a block diagram showing the schematic construction of a conventional frequency modulation radar apparatus for vehicle use.

Hereinafter, reference will be made to a frequency modulation radar apparatus for vehicle use according to a second embodiment of the present invention while referring to a flow chart in FIG. 3 together with FIGS. 8 and 9.

In this case, a frequency correction section in an FFT calculation section 8 calculates a frequency $f_t$ of a true peak signal based on a linear combination of a frequency $f_n$ of a peak signal and an under-mentioned frequency $f_{max}$, by using a strength $a_n$ of the peak signal, a strength $a_{n-1}$ of a signal of which the discrete frequency is smaller by one than the peak signal, a strength $a_{n+1}$ of a signal of which the discrete frequency is larger by one than the peak signal, the frequency $f_n$ of the peak signal, a frequency $f_{n-1}$ of the signal of which the discrete frequency is smaller by one than the peak signal, a frequency $f_{n+1}$ of the signal of which the discrete frequency is larger by one than the peak signal, a strength $a_{max}$ which is one of the strengths $a_{n-1}$, $a_{n+1}$ not smaller than the other, and the frequency $f_{max}$ corresponding to the strength $a_{max}$.

In addition, when the strength $a_{n-1}$ is larger than the strength $a_{n+1}$ and the frequency $f_t$ of the true peak signal is larger than the frequency $f_n$ of the peak signal, or when the strength $a_{n-1}$ is less than or equal to the strength $a_{n+1}$ and the frequency $f_t$ of the true peak signal is smaller than the frequency $f_n$ of the peak signal, the frequency correction section corrects and sets the frequency $f_t$ of the true peak signal to the frequency $f_n$ of the peak signal ($f_t=f_n$).

Further, a combination coefficient of the linear combination used in the frequency correction section is determined from the strength $a_n$ of the peak signal and the strength $a_{max}$ based on the characteristic of a window function.

Figure 3:
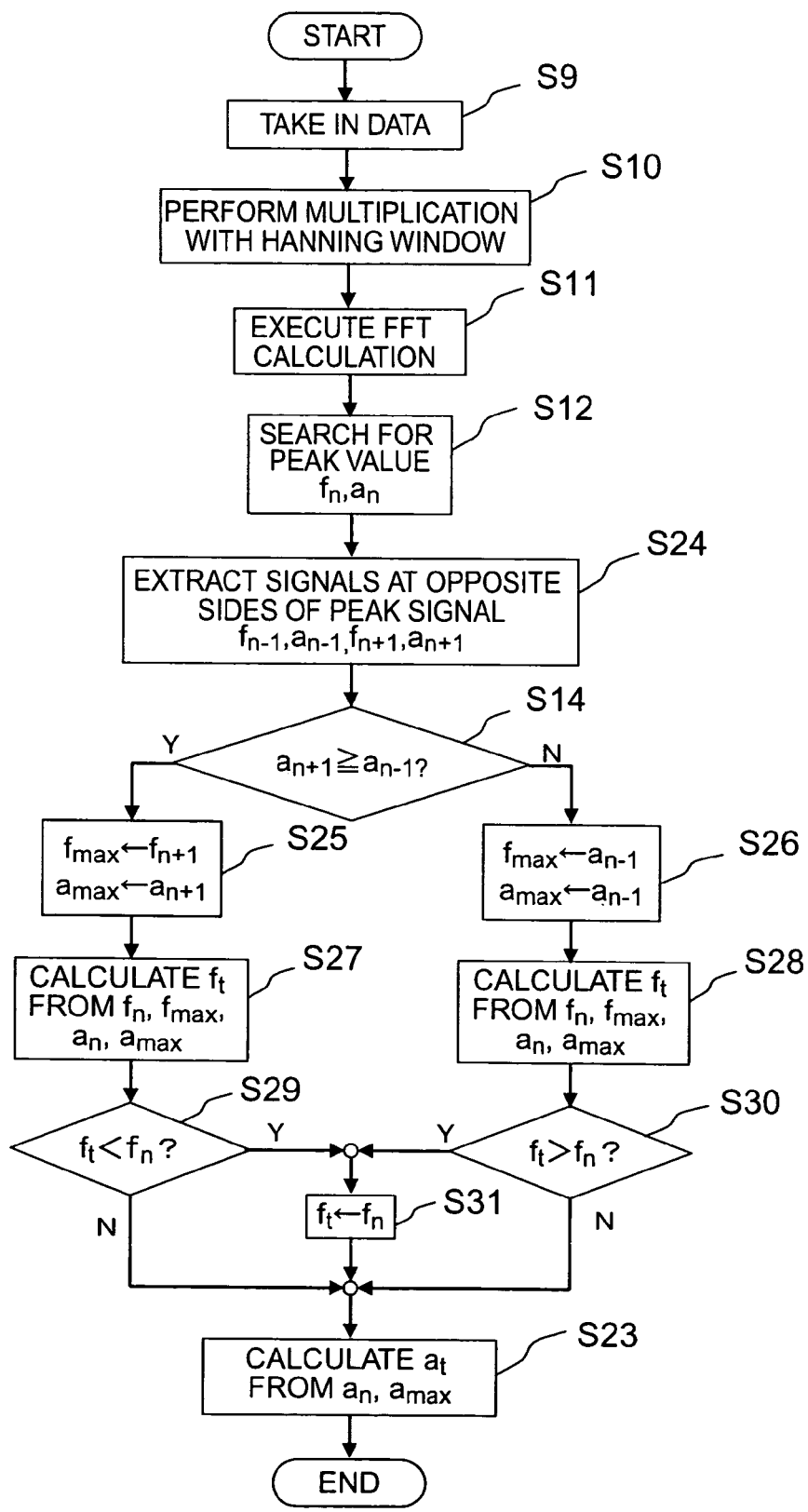
FIG. 3 is a flow chart illustrating the operation of an FFT calculation section according to a second embodiment of the present invention.

FIG. 3 is a flow chart that illustrates the operation of the FFT calculation section according to the second embodiment of the present invention, wherein the same or like processes (steps S9 through S12, S14, S23) as those described above (see FIG. 1) are identified by the same symbols while omitting a detailed description thereof.

First of all, reference will be made to the principle according to the second embodiment of the present invention while considering the case where a frequency drift amount (an amount of frequency correction) $\delta$ is in a range of $0 \leq \delta \leq 0.5$, as stated above.

When focusing on the equation $f_{n+1}-f_n=1 1/T$, as shown in FIG. 9, the frequency $f_t$ of the true peak signal is obtained from the above-mentioned expression (14) according to the following expression (17).

$$\delta = \frac{f_t - f_n}{f_{n+1} - f_n} = \frac{2a_{n+1} - a_n}{a_{n+1} + a_n} \quad (17)$$

$$\therefore f_t = \frac{(2a_n - a_{n+1})f_n + (2a_{n+1} - a_n)f_{n+1}}{a_n + a_{n+1}}$$

In addition, when the relation between individual strengths of the spectrum actually observed becomes "$2a_{n+1} < a_n$," due to the influence of noise, etc., as in the above-mentioned first embodiment, the relation between the individual frequencies corresponding to these individual strengths, respectively, becomes "$f_t < f_n$", so the accuracy of the frequency correction can be improved by correctively setting the frequency $f_t$ of the true peak signal to the frequency $f_n$ of the peak signal ($f_t=f_n$).

Similarly, in case of $\delta < 0$, too, the frequency $f_t$ of the true peak signal is obtained by the following expression (7).

$$f_t = \frac{(2a_n - a_{max})f_n + (2a_{max} - a_n)f_{max}}{a_n + a_{max}} \quad (7)$$

Further, in case of $f_t > f_n$, the frequency $f_t$ of the true peak signal is also correctively set to the frequency $f_n$ of the peak signal ($f_t=f_n$).

A specific processing operation based on the above-mentioned principle is shown in FIG. 3. That is, in FIG. 3, after the peak values ($f_n$, $a_n$) have been searched for in steps S9 through S12, the frequencies $f_{n-1}$, $f_{n+1}$ and the strengths $a_{n-1}$, $a_{n+1}$, of signals at the opposite adjacent sides of the peak signal are extracted (step S24).

Subsequently, the magnitude correlation of the strengths $a_{n-1}$, $a_{n+1}$, is determined (step S14). When it is determined as $a_{n+1} \geq a_{-1}$ (that is, YES), the strength $a_{n+1}$ is set as the strength $a_{max}$, and the frequency $f_{n+1}$ is set as the frequency $f_{max}$ corresponding to the strength $a_{max}$ (step S25).

In addition, the frequency $f_t$ of the true peak signal is calculated according to the above expression (7) by using the frequency $f_n$ of the peak signal, the frequency $f_{max}$ the strength $a_n$ of the peak signal, and the strength $a_{max}$ (step S27).

On the other hand, when it is determined as $a_{n+1} < a_{n-1}$ in step S14 (that is, NO), $a_{n-1}$ is set as the strength $a_{max}$, and $f_n$ is set as the frequency $f_{max}$ corresponding to the strength $a_{max}$ (step S26).

Also, the frequency $f_t$ of the true peak signal is calculated according to the above expression (7) by using the frequency $f_n$ of the peak signal, the frequency $f_{max}$ the strength $a_n$ of the peak signal, and the strength $a_{max}$ (step S28).

Then, subsequent to step S27, the magnitude correlation of the frequencies $f_t$, $f_n$ are compared so as to determine whether $f_t < f_n$ (step S29). When it is determined as $f_t > f_n$ (that is, YES), it is assumed that a further correction of the frequency $f_t$ of the true peak signal is necessary, and the frequency $f_t$ of the true peak signal is correctively set to the frequency $f_n$ of the peak signal ($f_t=f_n$) (step S31).

Similarly, subsequent to step S28, the magnitude correlation of the frequencies $f_t$, $f_n$ are compared so as to determine whether $f_t > f_n$ (step S30). When it is determined as $f_t > f_n$ (that is, YES), it is assumed that a further correction of the frequency $f_t$ of the true peak signal is necessary, and the frequency $f_t$ of the true peak signal is correctively set to the frequency $f_n$ of the peak signal ($f_t=f_n$) (step S31).

On the other hand, when it is determined as $f_t \geq f_n$ in step S29 (that is, NO), and when it is determined as $f_t \leq f_n$ in step S20 (that is, NO), the control flow proceeds to step S23 without executing step S31.

Finally, the FFT calculation section 8 calculates the strength at of the true peak signal by using the above expression (3) (step S23), and inputs the frequency $f_t$ of the true peak signal obtained in steps S27 through S31 and the strength $a_t$ of the true peak signal obtained in step S23 to the CPU 1 as corrected FFT calculation results.

Hereinafter, the operation of the CPU 1 is similar to that in the aforementioned conventional apparatus, and hence a detailed explanation thereof is omitted here.

Thus, in case where the frequency $f_t$ of the true peak signal is calculated based on the linear combination of the frequency $f_n$ of the peak signal and the frequency $f_{max}$ a beat frequency can be obtained with high precision and at high speed, as stated above. Here, note that either of the above-mentioned expression (3) or expression (4) may be used for the calculation of the strength at of the true peak signal, as stated above.

As described above, according to the second embodiment of the present invention, the frequency $f_t$ of the true peak signal is calculated based on the characteristic of the window function by using the peak signal and the frequency $f_{max}$ and the strength $a_{max}$ of one of the signals at the opposite adjacent sides of the peak signal which is not smaller in the signal strength than the other, and the frequency $f_t$ of the true peak signal is further corrected based on the magnitude correlation of the frequency $f_n$ of the peak signal and the frequency $f_t$ of the true peak signal. As a result, the beat frequency can be obtained with a high degree of accuracy while suppressing the influence of noise and avoiding an incorrect estimation due to noise.

In addition, the frequency $f_t$ of the true peak signal is calculated according to the above expression (7) based on theoretical computations, with respect to the FFT calculation result using a Hanning window, so the beat frequency can be obtained more accurately with respect to the FFT calculation result using the Hanning window.

Further, the strength at of the true peak signal is calculated according to the above expression (3) based on theoretical computations, with respect to the FFT calculation result using the Hanning window, so it is suitable for the FFT calculation result using the Hanning window, and the strength $a_t$ of the true peak signal can be obtained with high accuracy.

Furthermore, the strength at of the true peak signal is calculated according to the above expression (4) with respect to the FFT calculation result using the Hanning window, so it is suitable for the FFT calculation result using the Hanning window, and the strength at of the true peak signal can be obtained at high speed.

Embodiment 3

Figure 4:
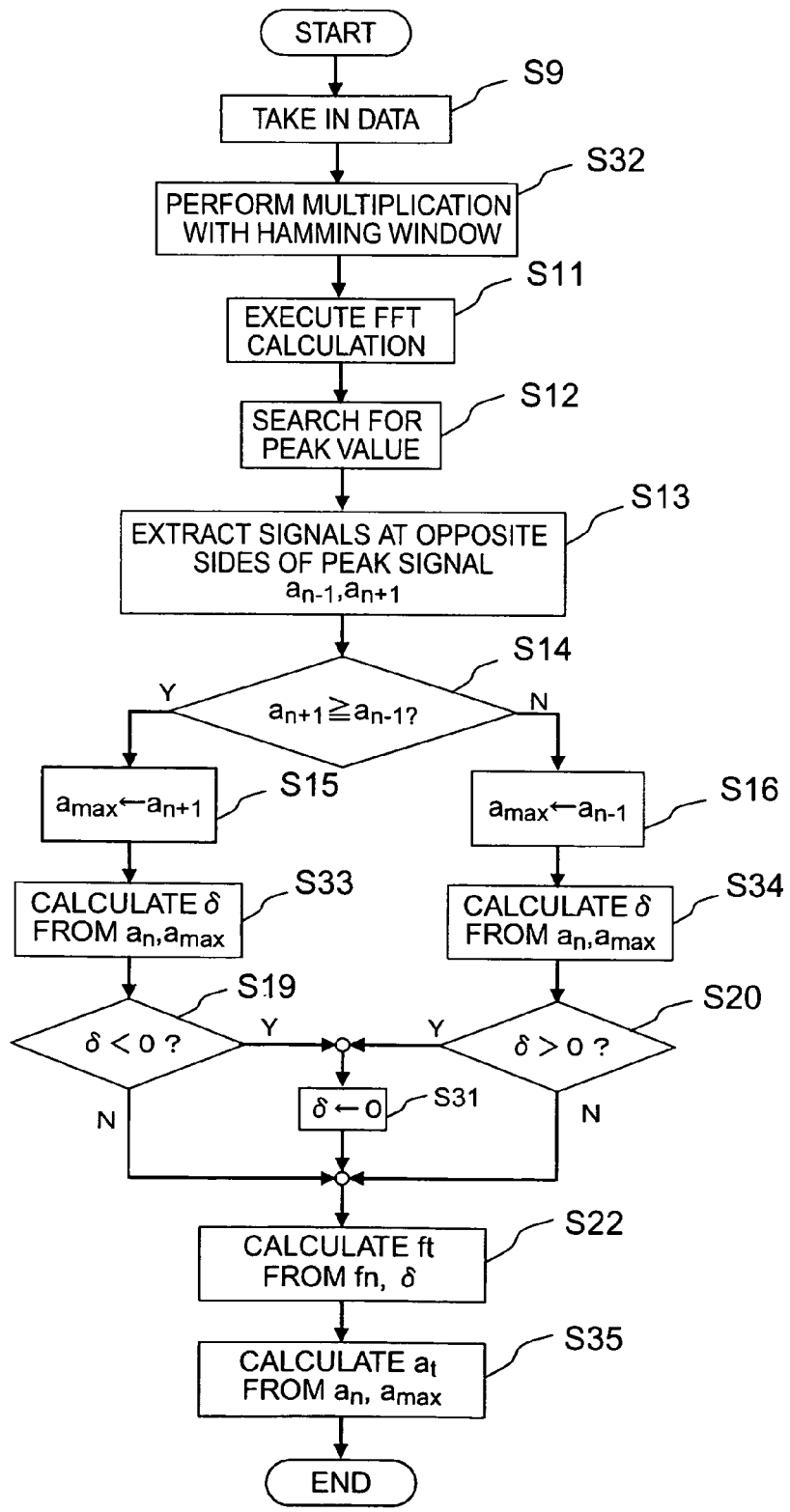
FIG. 4 is a flow chart illustrating the operation of an FFT calculation section according to a third embodiment of the present invention.

Although in the above-mentioned first embodiment (see FIG. 1), the Hanning window is multiplied or used by the FFT calculation section 8 in step S10, a Hamming window may instead be applied, as shown in step S32 in FIG. 4.

Hereinafter, reference will be made to a frequency modulation radar apparatus for vehicle use according to a third embodiment of the present invention while referring to a flow chart in FIG. 4 together with FIGS. 8 and 9. In FIG. 4, the same or like processes (steps S9, S11 through S16, S19 through S22) as those described above (see FIG. 1) are identified by the same symbols while omitting a detailed description thereof.

First of all, an FFT calculation section 8 takes in a sampled beat signal from an A/D converter 7 (step S9), and then the sampled beat signal is multiplied by a Hamming window $W_{ham}(t)$, as shown in the following expression (18) (step S32).

$$W_{ham}(t) = \begin{cases} \frac{25}{46} - \frac{21}{46}\cos\frac{2\pi}{T}t & (0 \leq t \leq T) \\ 0 & (t < 0, t > T) \end{cases} \tag{18}$$

Hereinafter, the processes from the FFT calculation execution processing (step S11) to the processing of acquiring the frequencies and strengths of the signals at the opposite sides of the peak signal (step S13) are the same as those as referred to above, and hence an explanation thereof is omitted.

Here, reference will be made to a specific shape of the spectrum according to the Hamming window function.

A Fourier transform is applied to the humming window function $W_{ham}(t)$ as represented by the above expression (18), and the result thus obtained is multiplied by a frequency resolution of 1/T in the FFT calculation so as to be normalized in such a manner as to take a maximum value of "1", whereby the following expression (19) is obtained as a signal strength $A_{ham}(\delta)$ at a frequency of $\delta[1/T]$.

$$A_{ham}(\delta) = \left|\frac{(4\delta^2 - 25)\sin\pi\delta}{46\pi\delta(1-\delta^2)}\right|, A_{ham}(0) = 1, A_{ham}(\pm 1) = \frac{21}{50} \tag{19}$$

Next, reference will be made to a method of obtaining the frequency $f_t$ of the true peak signal based on the above expression (19). Here, let us consider the case where $f_t=f_n+\delta$, and $0 \leq \delta \leq 0.5$, as in the above-mentioned first embodiment.

First of all, the individual strengths $a_n, a_{n+1}$, are calculated, as shown by the following expression (20).

$$\begin{cases} a_n = A_{ham}(-\delta) = \frac{(25 - 4\delta^2)\sin\pi\delta}{25\pi\delta(1-\delta)(1+\delta)} \\ a_{n+1} = A_{ham}(1-\delta) = \frac{\{25 - 4(1-\delta)^2\}\sin\pi\delta}{25\pi\delta(1-\delta)(2-\delta)} \end{cases} \tag{20}$$

The following expression (21) holds from the above expression (20).

$$\frac{a_n - a_{n+1}}{a_n + a_{n+1}} = \frac{8\delta^3 - 12\delta^2 - 54\delta + 29}{-4\delta^2 + 4\delta + 71} \tag{21}$$

Here, reference will be made to the effectiveness of the expression (21) while referring to an explanatory view of FIG. 5.

Figure 5:
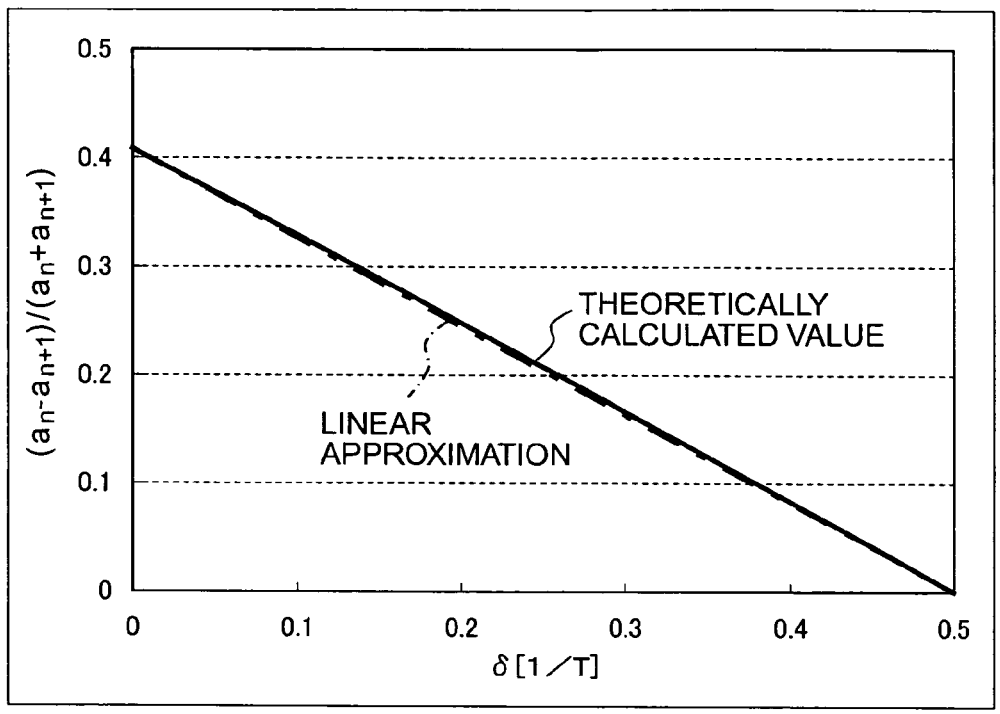
FIG. 5 is an explanatory view showing the relation between an amount of frequency correction and a strength ratio of signals when a Hamming window is used according to the third embodiment of the present invention.

In FIG. 5, the axis of abscissa represents an amount of frequency correction $\delta[1/T]$, and the axis of ordinate represents a strength ratio $(a_n - a_{n+1})/(a_n + a_{n+1})$, with a solid line indicating the relation of the above expression (21).

As is clear from FIG. 5, the relation of the expression (21) is substantially linear in a range of $0 \leq \delta \leq 0.5$, so it is able to be approximated by a straight line (see an alternate long and short dash line in FIG. 5) that connects between two points corresponding to "δ=0" and "δ=0.5", respectively, in the expression (21). This straight line is represented by the following expression (22).

$$\frac{a_n - a_{n+1}}{a_n + a_{n+1}} = \frac{29}{71}(-2\delta + 1) \quad (22)$$

$$\therefore \delta = \frac{1}{29}\left(\frac{50a_{n+1} - 21a_n}{a_{n+1} + a_n}\right)$$

Here, when the relation of spectrum strengths actually observed becomes "$(50/21)a_{n+1} < a_n$" due to the influence of noise, etc., the amount of frequency correction δ calculated by the above expression (22) becomes a negative value (δ<0) in spite of the fact that it is not in actuality negative (δ≧0). Accordingly, when the amount of frequency correction δ is calculated as negative (δ<0) according to the expression (22), the accuracy of the frequency correction can be improved by correctively setting the amount of frequency correction δ to zero (δ=0).

Next, reference will be made to a method of estimating the strength $a_t$ of the true peak signal.

First of all, as stated above, the signal strength $A_{han}(\delta)$ in the amount of frequency correction δ is normalized so as to make the maximum value equal to "1", so the following expression (23) holds.

$$a_n = a_t \frac{(25 - 4\delta^2)\sin\pi\delta}{25\pi\delta(1 - \delta)(1 + \delta)} \quad (23)$$

The following estimation expression (5) is obtained by assigning the above-mentioned expression (22) to the above expression (23).

$$a_t = \frac{(25/29)\pi(79a_{max} + 8a_n)}{(a_{max} + a_n)(45a_{max} + 187a_n)(245a_{max} + 103a_n)} \times a_n \quad (5)$$

$$\sin\left\{\frac{(50/29)a_{max} - (21/29)a_n}{a_{max} + a_n}\pi\right\}$$

Similarly, when the amount of frequency correction δ is negative (δ<0), too, the following expression (24) can be derived by calculating the strength $a_{n-1}$ as $A_{ham}(-1-\delta)$ (i.e., $a_{n-1} = A_{ham}(-1-\delta)$) and by using a linear approximation.

$$\delta = -\frac{1}{29}\left(\frac{50a_{n-1} - 21a_n}{a_{n-1} + a_n}\right) \quad (24)$$

In addition, the amount of frequency correction δ, when calculated as δ>0 according to the above expression (24) due to the influence of noise, etc., is correctively set to zero (δ=0). Further, it is possible to easily derive that the strength at of the true peak signal can be calculated by the above estimation expression (5).

Accordingly, based on the above point of view, in FIG. 4, there is shown a processing procedure (from step S14 onward) until the frequency $f_t$ and the strength $a_t$ of the true peak signal are estimated by using the strengths $a_{n-1}$, $a_{n+1}$ at the opposite adjacent sides of the peak signal obtained in step S13.

First of all, similarly as stated above, the magnitude correlation of the strengths $a_{n-1}$, $a_{n+1}$ is determined (step S14), and one of the strengths not smaller than the other is determined as a strength $a_{max}$ in accordance with the magnitude correlation of the strengths $a_{n-1}$, $a_{n+1}$ (steps S15 and S16).

Then, following the processing of setting the strength $a_{max}$ (steps S15, S16), the amount of frequency correction δ is calculated by the following expression (2).

$$\delta = \begin{cases} \frac{(50/29)a_{n+1} - (21/29)a_n}{a_{n+1} + a_n} & (\text{when } a_{n-1} \leq a_{n+1}) \\ -\frac{(50/29)a_{n-1} - (21/29)a_n}{a_{n-1} + a_n} & (\text{when } a_{n-1} > a_{n+1}) \end{cases} \quad (2)$$

Also, following steps S33, S34, the sign of the amount of frequency correction δ is determined (steps S19, S20), as stated above, and when a further correction of the amount of frequency correction δ is necessary, the amount of frequency correction δ is set to zero (δ=0) in step S21.

Subsequently, the frequency $f_t$ of the true peak signal is calculated as a corrected frequency $f_n + \delta$ (step S22), and thereafter, the strength $a_t$ of the true peak signal is calculated according to the above expression (5) by using the individual strengths $a_n$, $a_{max}$ (step S35).

Hereinafter, the FFT calculation section 8 inputs the frequency $f_t$ and the strength $a_t$ of the true peak signal thus obtained to the CPU 1 as corrected FFT calculation results. The operation of the CPU 1 thereafter is similar to the one stated above, and hence a detailed explanation thereof is omitted here.

Although in the above-mentioned third embodiment, the strength $a_t$ of the true peak signal is calculated by using the above expression (3), an approximate expression comprising the following expression (6) may be used so as to simplify (i.e., speed up) the arithmetic calculation.

$$a_t = 0.82a_n + 0.38a_{max} \quad (6)$$

In the above expression (6), individual coefficients "0.82", "0.38" are the values that are set to minimize the absolute value of a strength error on the assumption that a linear combination of individual strengths $a_n$, $a_{n+1}$, is taken as the strength at of the true peak signal (in case of $a_{n+1} \geq a_{n-1}$).

Here, reference will be made to the effectiveness of the expression (6) while referring to an explanatory view of FIG. 6.

Figure 6:
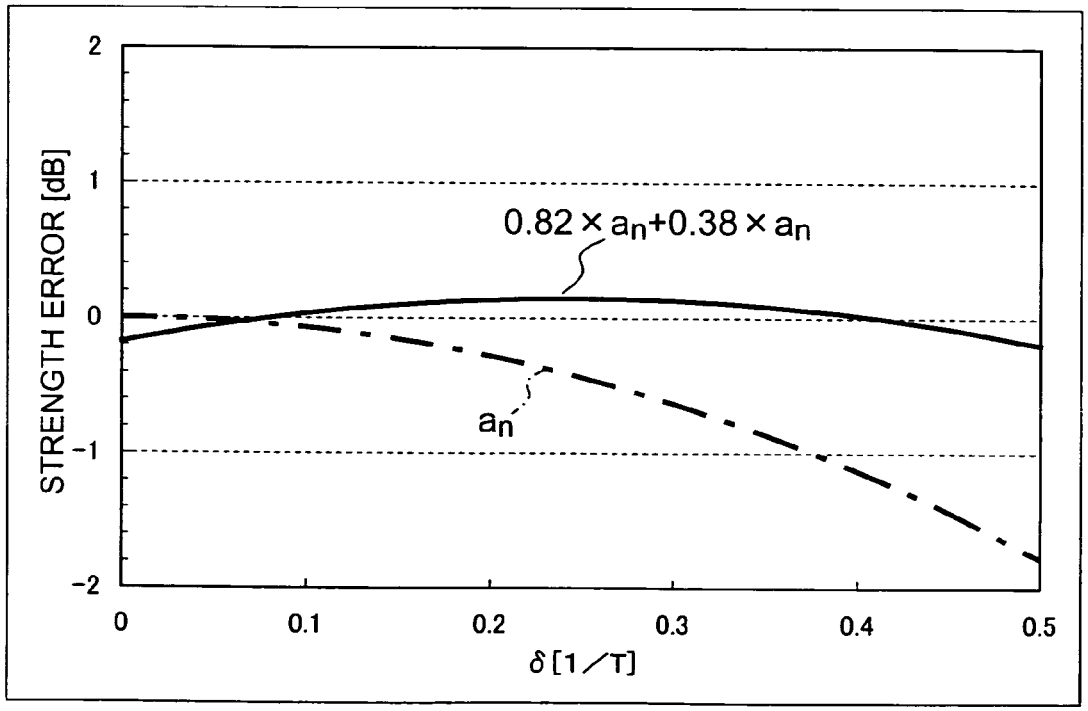
FIG. 6 is an explanatory view showing a strength error of a true peak signal when the Hamming window is used according o the third embodiment of the present invention.

When the strength an is used as it is as the strength at of the true peak signal, a strength error, indicated by an alternate long and short dash line in FIG. 6, will occur in accordance with the amount of frequency correction δ, so the strength $a_t$ of the true peak signal will have an error of about 1.8 [dB] at maximum, as is clear from the above-mentioned expression (22).

On the other hand, in case where the strength at obtained from the above-mentioned approximate expression (6) is taken as the strength of the true peak signal, the strength error is improved, as shown by a solid line in FIG. 6, and even in the worst case, an accuracy with a strength error of less than 0.2 [dB] can be obtained.

Although description has been made of the case of $a_{n+1} \geq a_{n-1}$ (see FIG. 9), it is needless to say that similarly excellent accuracy can be obtained even in case of $a_{n+1} < a_{n-1}$.

As described above, according to the third embodiment of the present invention, the amount of frequency correction δ is obtained according to the expression (2) based on theoretical computations with respect to the FFT calculation result that uses the Hamming window, so it is suitable for the FFT calculation result using the Hamming window, and the beat frequency can be obtained more accurately.

Further, the strength at of the true peak signal is calculated according to the above expression (5) based on theoretical computations, with respect to the FFT calculation result using the Hamming window, so it is suitable for the FFT calculation result using the Hamming window, and the strength at of the true peak signal can be obtained with high accuracy.

Furthermore, the strength $a_t$ of the true peak signal is calculated according to the above expression (6) with respect to the FFT calculation result using the Hamming window, so it is suitable for the FFT calculation result using the Hamming window, and the strength $a_t$ of the true peak signal can be obtained at high speed.

Embodiment 4

Figure 7:
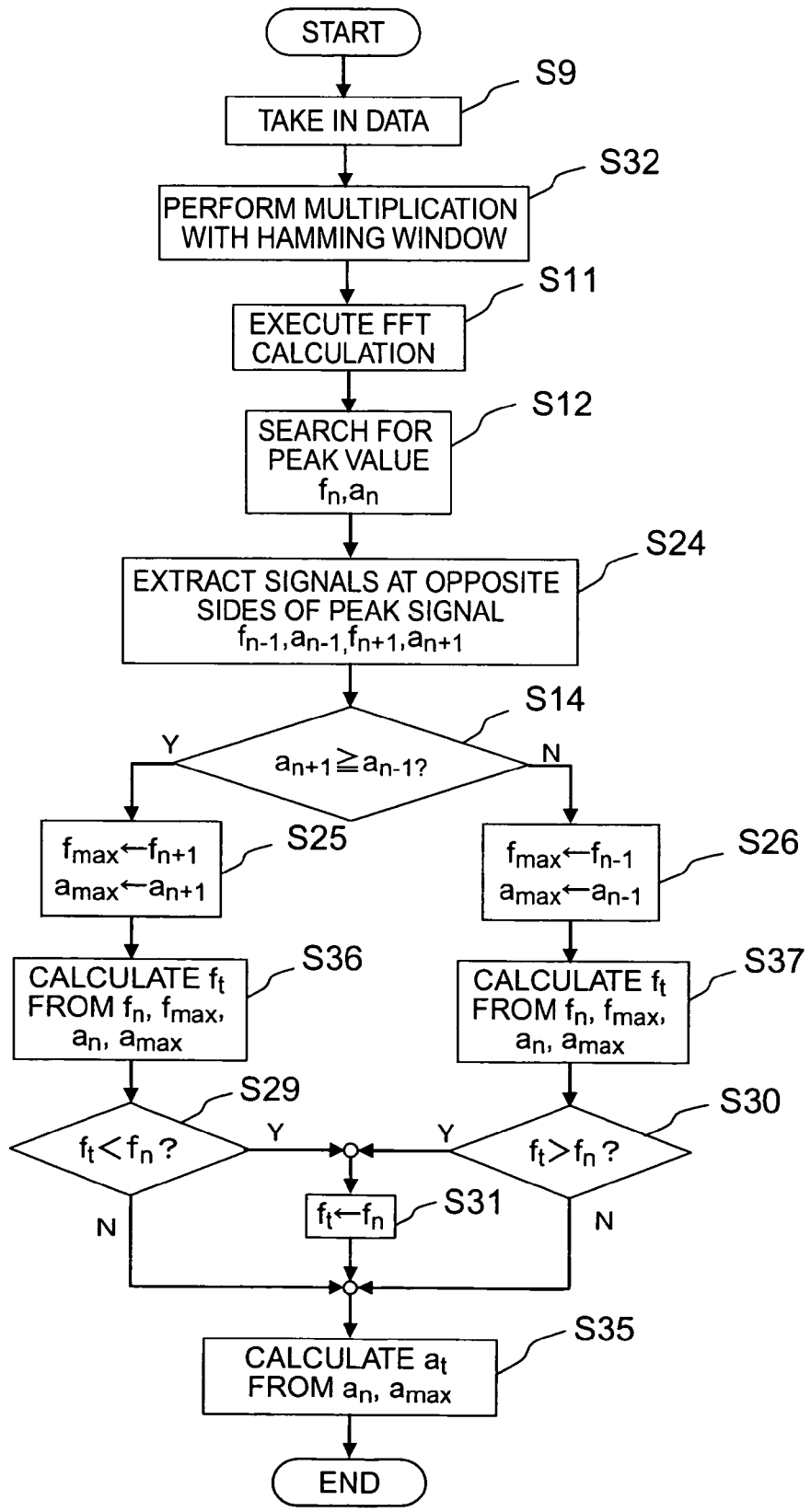
FIG. 7 is a flow chart illustrating the operation of an FFT calculation section according to a fourth embodiment of the present invention.

Although in the above-mentioned second embodiment (see FIG. 3), the Hanning window is multiplied or used by the FFT calculation section 8 in step S10, a Hamming window may instead be applied, as shown in step S32 in FIG. 7.

Hereinafter, reference will be made to a frequency modulation radar apparatus for vehicle use according to a fourth embodiment of the present invention while referring to a flow chart in FIG. 7 together with FIGS. 8 and 9. In FIG. 7, the same or like processes (steps S9, S11 S12, S14, S24 through S26, S29 through S32, S35) as those described above (see FIGS. 3 and 4) are identified by the same symbols while omitting a detailed description thereof.

First of all, reference will be made to the principle of the present invention in consideration of a range of $0 \leq \delta \leq 0.5$, as in the above-mentioned third embodiment.

Now, when focusing on the equation $f_{n+1} - f_n = 1/T$, the following expression (25) is obtained from the above-mentioned expression (22).

$$\delta = \frac{f_t - f_n}{f_{n+1} - f_n} = \frac{1}{29}\left(\frac{50 a_{n+1} - 21 a_n}{a_{n+1} + a_n}\right) \quad (25)$$

$$\therefore f_t = \frac{\{(50/29)a_n - (21/29)a_{n+1}\}f_n + \{(50/29)a_{n+1} - (21/29)a_n\}f_{n+1}}{a_n + a_{n+1}}$$

In addition, when the relation between individual strengths of the spectrum actually observed becomes "$(50/21)a_{n+1} < a_n$" due to the influence of noise, etc., similarly as stated above, the relation between the individual frequencies corresponding to these individual strengths, respectively, becomes "$f_t < f_n$", so the accuracy of the frequency correction can be improved by correctively setting the frequency $f_t$ of the true peak signal to the frequency $f_n$ of the peak signal ($f_t = f_n$).

Similarly, in case of $\delta < 0$, the frequency $f_t$ of the true peak signal is obtained by the following expression (8).

$$f_t = \frac{\{(50/29)a_n - (21/29)a_{max}\}f_n + \{(50/29)a_{max} - (21/29)a_n\}f_{max}}{a_n + a_{max}} \quad (8)$$

Further, in case of $f_t > f_n$, the frequency $f_t$ of the true peak signal is also correctively set to the frequency $f_n$ of the peak signal ($f_t = f_n$).

A specific processing operation based on the above-mentioned principle is shown in FIG. 7. That is, similar to the case of the above-mentioned second embodiment (FIG. 3), the frequencies $f_{n-1}, f_{n+1}$ and the strengths $a_{n-1}, a_{n+1}$ of signals at the opposite adjacent sides of the peak signal are extracted (step S24), and the magnitude correlation of the strengths $a_{n-1}, a_{n+1}$ is determined (step S14), whereby the frequency $f_{max}$ and the strength $a_{max}$ of one of the signals at the opposite adjacent sides of the peak signal which is not smaller in the signal strength than the other are determined in accordance with the magnitude correlation of the strengths $a_{n-1}, a_{n+1}$ (steps S25 and S26).

Then, following the respective steps S25, S26, the frequency $f_t$ of the true peak signal is calculated by using the above expression (8) (steps S36 and S37).

Hereinafter, similarly as stated above (FIG. 3), the magnitude correlation of the frequencies $f_t, f_n$ is determined (step S29 and S30), and when an additional correction of the frequency $f_t$ of the true peak signal is necessary, the frequency $f_t$ of the true peak signal is correctively set to the frequency $f_n$ of the peak signal ($f_t = f_n$) in step S31.

Finally, similarly as stated above (FIG. 4), the strength at of the true peak signal is calculated according to the above expression (5) by using the individual strengths $a_n, a_{max}$ (step S35). The processing operation by the CPU 1 thereafter is similar to the one stated above, and hence a detailed explanation thereof is omitted here. Here, note that either of the above-mentioned expression (5) or expression (6) may be used for the calculation of the strength $a_t$ of the true peak signal (step S35), similar to the above-mentioned third embodiment.

As described above, according to the fourth embodiment of the present invention, the strength at of the true peak signal is calculated according to the above expression (5) based on theoretical computations, with respect to the FFT calculation result using the Hamming window, so it is suitable for the FFT calculation result using the Hamming window, and the strength at of the true peak signal can be obtained with high accuracy.

Furthermore, the strength at of the true peak signal is calculated according to the above expression (6) with respect to the FFT calculation result using the Hamming window, so it is suitable for the FFT calculation result using the Hamming window, and the strength $a_t$ of the true peak signal can be obtained at high speed.

Further, the strength at of the true peak signal is calculated according to the above expression (8) based on theoretical computations, with respect to the FFT calculation result using the Hamming window, so it is suitable for the FFT calculation result using the Hamming window, and the beat frequency can be obtained more accurately.

While the invention has been described in terms of preferred embodiments, those skilled in the art will recognize that the invention can be practiced with modifications within the spirit and scope of the appended claims.

What is claimed is:

1. A frequency modulation radar apparatus for vehicle use which sends a transmission signal the frequency of which is frequency modulated so as to linearly rise or fall in accordance with the elapse of time, receives the signal reflected by a target object, samples a beat signal that is obtained by mixing the reception signal thus received with said transmission signal, performs a discrete frequency analysis by using a predetermined window function, extracts a peak signal from a spectrum of said beat signal obtained, and calculates a distance or a relative speed to said target object based on a frequency ($f_n$) of said peak signal, said apparatus comprising:

a frequency correction section that adds an amount of frequency correction ($\delta$) to said frequency ($f_n$) of said peak signal thereby to calculate a corrected frequency ($f_n+\delta$); and a CPU that calculates the distance or relative speed to said target object based on said corrected frequency ($f_n+\delta$);

wherein by using a strength ($a_n$) of said peak signal, a strength ($a_{n-1}$) of a signal of which a discrete frequency is smaller by one than that of said peak signal, a strength ($a_{n+1}$) of a signal of which a discrete frequency is larger by one than that of said peak signal, and a strength ($a_{max}$) of one of said strength ($a_{n-1}$) and said strength ($a_{n+1}$) which is not smaller than the other, said frequency correction section calculates said amount of frequency correction ($\delta$) based on the strength ($a_n$) of said peak signal, said strength ($a_{max}$) and a characteristic of said window function; and when said strength ($a_{n-1}$) is larger than said strength ($a_{n+1}$) and said amount of frequency correction ($\delta$) is positive, or when said strength ($a_{n-1}$) is less than or equal to said strength ($a_{n+1}$) and said amount of frequency correction ($\delta$) is negative, said frequency correction section correctively sets said amount of frequency correction ($\delta$) to zero ($\delta=0$).

2. The frequency modulation radar apparatus for vehicle use as set forth in claim 1, wherein said window function is a Hanning window; and said frequency correction section calculates said amount of frequency correction ($\delta$) by the following expression (1)

$$\delta = \begin{cases} \dfrac{2a_{n+1} - a_n}{a_{n+1} + a_n} & \text{(when } a_{n-1} \leq a_{n+1}) \\ -\dfrac{2a_{n-1} - a_n}{a_{n-1} + a_n} & \text{(when } a_{n-1} > a_{n+1}) \end{cases} \quad (1)$$

3. The frequency modulation radar apparatus for vehicle use as set forth in claim 1, wherein said window function is a Hamming window; and said frequency correction section calculates said amount of frequency correction ($\delta$) by the following expression (2)

$$\delta = \begin{cases} \dfrac{(50/29)a_{n+1} - (21/29)a_n}{a_{n+1} + a_n} & \text{(when } a_{n-1} \leq a_{n+1}) \\ -\dfrac{(50/29)a_{n-1} - (21/29)a_n}{a_{n-1} + a_n} & \text{(when } a_{n-1} > a_{n+1}) \end{cases} \quad (2)$$

4. The frequency modulation radar apparatus for vehicle use as set forth in claim 1, wherein said window function is a Hanning window; and said frequency correction section uses a strength ($a_t$) obtained by the following expression (3) as a strength of a true peak signal $$a_t = \dfrac{3\pi a_{max}(2a_{max} - a_n)(2a_n - a_{max})}{(a_{max} + a_n)^3 \sin\left(\dfrac{2a_{max} - a_n}{a_{max} + a_n}\pi\right)} \times a_n. \quad (3)$$

5. The frequency modulation radar apparatus for vehicle use as set forth in claim 1, wherein said window function is a Hanning window; and said frequency correction section uses a strength ($a_t$) obtained by the following expression (4) as a strength of a true peak signal.

$$a_t = 0.81a_n + 0.35a_{max} \quad (4).$$

6. The frequency modulation radar apparatus for vehicle use as set forth in claim 1, wherein said window function is a Hamming window; and said frequency correction section uses a strength ($a_t$) obtained by the following expression (5) as a strength of a true peak signal $$a_t = \dfrac{(25/29)\pi(79a_{max} + 8a_n)(50a_{max} - 21a_n)(50a_n - 21a_{max})}{(a_{max} + a_n)(45a_{max} + 187a_n)(245a_{max} + 103a_n)\sin\left\{\dfrac{(50/29)a_{max} - (21/29)a_n}{a_{max} + a_n}\pi\right\}} \times a_n. \quad (5)$$

7. The frequency modulation radar apparatus for vehicle use as set forth in claim 1, wherein said window function is a Hamming window; and said frequency correction section uses a strength ($a_t$) obtained by the following approximate expression (6) as a strength of a true peak signal $$a_t = 0.82a_n + 0.38a_{max} \quad (6).$$

8. A frequency modulation radar apparatus for vehicle use which sends a transmission signal the frequency of which is frequency modulated so as to linearly rise or fall in accordance with the elapse of time, receives the signal reflected by a target object, samples a beat signal that is obtained by mixing the reception signal thus received with said transmission signal, performs a discrete frequency analysis by using a predetermined window function, extracts a peak signal from a spectrum of said beat signal obtained, and calculates a distance or a relative speed to said target object based on a frequency ($f_n$) of said peak signal, said apparatus comprising:

a frequency correction section that calculates a frequency ($f_t$) of a true peak signal; and a CPU that calculates a distance or a relative speed to said target object based on the frequency ($f_t$) of said true peak signal;

wherein by using a strength ($a_n$) of said peak signal, a strength ($a_{n-1}$) of a signal of which a discrete frequency is smaller by one than that of said peak signal, a strength ($a_{n+1}$) of a signal of which a discrete frequency is larger by one than that of said peak signal, the frequency ($f_n$) of said peak signal, a frequency ($f_{n-1}$) of said signal of which the discrete frequency is smaller by one than that of said peak signal, a frequency ($f_{n+1}$) of said signal of which a discrete frequency is larger by one than that of said peak signal, a strength ($a_{max}$) of one of said strength ($a_{n-1}$) and said strength ($a_{n+1}$) which is not smaller than the other, and a frequency ($f_{max}$) corresponding to said strength ($a_{max}$), said frequency correction section calculates the frequency ($f_t$) of said true peak signal based on a linear combination of the frequency ($f_n$) of said peak signal and said frequency ($f_{max}$); and when said strength ($a_{n-1}$) is larger than said strength ($a_{n+1}$) and the frequency ($f_t$) of said true peak signal is larger than the frequency ($f_n$) of said peak signal, or when said strength ($a_{n-1}$) is less than or equal to said strength ($a_{n+1}$) and the frequency ($f_t$) of said true peak signal is smaller than the frequency ($f_n$) of said peak signal, said frequency correction section correctively sets the frequency ($f_t$) of said true peak signal to the frequency ($f_n$) of said peak signal ($f_t = f_n$); and a combination coefficient of said linear combination is determined from the strength ($a_n$) of said peak signal and said strength ($a_{max}$) based on a characteristic of said window function.

9. The frequency modulation radar apparatus for vehicle use as set forth in claim 8, wherein said window function is a Hanning window; and said frequency correction section calculates the frequency ($f_t$) of said true peak signal by the following expression (7)

$$f_t = \frac{(2a_n - a_{max})f_n + (2a_{max} - a_n)f_{max}}{a_n + a_{max}}. \quad (7)$$

10. The frequency modulation radar apparatus for vehicle use as set forth in claim 8, wherein said window function is a Hamming window; and said frequency correction section calculates the frequency ($f_t$) of said true peak signal by the following expression (8)

$$f_t = \frac{\{(50/29)a_n - (21/29)a_{max}\}f_n + \{(50/29)a_{max} - (21/29)a_n\}f_{max}}{a_n + a_{max}}. \quad (8)$$

11. The frequency modulation radar apparatus for vehicle use as set forth in claim 8, wherein said window function is a Hanning window; and said frequency correction section uses a strength ($a_t$) obtained by the following expression (3) as a strength of said true peak signal $$a_t = \frac{3\pi a_{max}(2a_{max} - a_n)(2a_n - a_{max})}{(a_{max} + a_n)^3 \sin\left(\frac{2a_{max} - a_n}{a_{max} + a_n}\pi\right)} \times a_n. \quad (3)$$

12. The frequency modulation radar apparatus for vehicle use as set forth in claim 8, wherein said window function is a Hanning window; and said frequency correction section uses a strength ($a_t$) obtained by the following approximate expression (4) as a strength of said true peak signal $$a_t = 0.81 a_n + 0.35 a_{max} \quad (4).$$

13. The frequency modulation radar apparatus for vehicle use as set forth in claim 8, wherein said window function is a Hamming window; and said frequency correction section uses a strength ($a_t$) obtained by the following expression (5) as a strength of said true peak signal $$a_t = \frac{(25/29)\pi(79a_{max} + 8a_n)(50a_{max} - 21a_n)(50a_n - 21a_{max})}{(a_{max} + a_n)(45a_{max} + 187a_n)(245a_{max} + 103a_n) \sin\left\{\frac{(50/29)a_{max} - (21/29)a_n}{a_{max} + a_n}\pi\right\}} \times a_n. \quad (5)$$

14. The frequency modulation radar apparatus for vehicle use as set forth in claim 8, wherein said window function is a Hamming window; and said frequency correction section uses a strength ($a_t$) obtained by the following approximate expression (6) as a strength of said true peak signal $$a_t = 0.82 a_n + 0.38 a_{max} \quad (6).$$

* * * * *